United States Patent [19]

Dria et al.

[11] Patent Number: 4,507,212
[45] Date of Patent: Mar. 26, 1985

[54] NITRILE COMPOUNDS AS OIL FIELD BIOCIDES

[75] Inventors: Dennis E. Dria, Austin, Tex.; Noel J. Bremer, Kent, Ohio; Myra A. Dria, Austin, Tex.; Rodger W. McKain, Chagrin Falls, Ohio

[73] Assignee: The Standard Oil Company, Cleveland, Ohio

[21] Appl. No.: 441,874

[22] Filed: Nov. 15, 1982

[51] Int. Cl.$^3$ .............................................. E21B 43/22
[52] U.S. Cl. ................................. 252/8.55 D; 514/526
[58] Field of Search .................... 252/8.55 R, 8.55 D, 252/8.5 C; 424/304

[56] References Cited

U.S. PATENT DOCUMENTS

| | | |
|---|---|---|
| 2,356,075 | 8/1944 | Migrdichian . |
| 2,555,796 | 6/1951 | Krause . |
| 2,839,467 | 6/1958 | Hutchison et al. ............. 252/8.55 |
| 2,917,428 | 12/1959 | Hitzman ...................... 252/8.55 |
| 2,933,429 | 4/1960 | Wicker, Jr. et al. . |
| 2,937,918 | 5/1960 | Pasternak . |
| 2,987,475 | 6/1961 | Legator . |
| 3,145,138 | 8/1964 | Baker et al. . |
| 3,250,798 | 5/1966 | Shulgin . |
| 3,321,363 | 5/1967 | Sousa . |
| 3,424,847 | 1/1969 | Selz . |
| 4,206,229 | 6/1980 | Brandman et al. . |
| 4,335,787 | 6/1982 | Stapp . |

OTHER PUBLICATIONS

Hovious et al., "Identification and Control of Petrochemical Pollutants Inhibitory to Anaerobic Processes", U.S. Nat. Tech. Inform. Serv., PB Rep. No. 222287/5(1973), (pp. O-5, 11, 32, 39-42, 98).

Miller et al., "Investigation of Selected Potential Environmental Contaminants: Acrylonitrile", Draft Final Report EPA Contract No. 68-01-3893, (Feb. 1978).

Kobayashi et al., "Microbial Removal of Hazardous Organic Compounds", *Environ. Sci. Technol.,* vol. 17, No. 3, 1982.

National Association of Corrosion Engineers, "The Role of Bacteria in the Corrosion of Oil Field Equipment", Technical Practices Committee, Pub. No. 3, (1976).

Rueska et al., Article in *Oil and Gas Journal,* Mar. 8, 1982, pp. 253-264.

Smith et al., Article in *The Oil and Gas Journal,* Dec. 4, 1978, pp. 87-91.

*Primary Examiner*—Herbert B. Guynn
*Attorney, Agent, or Firm*—William A. Heidrich; David J. Untener; Larry W. Evans

[57] ABSTRACT

Unsaturated nitrile compounds, e.g., acrylonitrile, are used as microbiocides to inhibit undesired bacterial growth in injection water used in enhanced oil recovery methods. The biocides are efficacious for the control of sulfate reducing bacteria, including *Desulfovibrio desulfuricans.*

9 Claims, No Drawings

NITRILE COMPOUNDS AS OIL FIELD BIOCIDES

BACKGROUND OF THE INVENTION

1. Field of the Invention

This invention relates to a process for treating injection water used in enhanced oil recovery methods in order to prevent the growth of microorganisms in the water and oil.

2. Discussion of the Art

The problem of undesired growth of microorgansims in oil-bearing formations has plagued oil producers since the advent of waterflooding as a secondary oil production technique. Bacterial growth can result in souring of the crude oil in a reservoir, which is caused by the reduction of inorganic sulfate compounds to sulfides by certain bacteria. Plugging of the reservoir, wells, and related equipment can even result if such growth is substantial. In addition, equipment will quickly corrode if the metal is exposed to byproducts of microbial metabolism, particularly hydrogen sulfide.

Although several types of microorganisms are potentially deleterious to oil production, the major problems are caused by anaerobic sulfate-reducing bacteria (SRB), especially those of the genus Desulfovibrio. Further dissussion of microorganisms is provided in "The Role of Bacteria in the Corrosion of Oil Field Equipment", National Association of Corrosion Engineers, Technical Practices Committee, Pub. No. 3 (1976).

Other useful information can be found in Smith, R.S., and Thurlow, M.T., "Guidelines Help Counter SRB Activity in Injection Water", *The Oil and Gas Journal,* Dec. 4, 1978, (pp 87–91) and also in Ruseska, I, et al., "Biocide Testing Against Corrosion-Causing Oil-field Bacteria Helps Control Plugging", *Oil and Gas Journal,* Mar. 8, 1982, (pp 253–64). These sources generally recommend the use of a chemical microbiocide as part of a program to limit the growth of bacteria in oil fields or injection water.

Microorganisms in oilfields or in injection water are generally classified by their effect. Sulfate-reducing bacteria, slime-forming bacteria, iron-oxidizing bacteria, and miscellaneous organisms such as algae, sulfide oxidizing bacteria, yeast and molds, and protozoa can be encountered.

All of these microorganisms are capable of clogging filters and injection wells, and some can cause plugging of the rock formation if they can survive the temperatures and pressures found in the reservoir. In addition, certain organisms can liberate sulfide compounds which cause souring of the oil and corrosion of the wellpipe and other equipment. Unless precautions are taken to inhibit microbial growth, waterflooding can seriously diminish the value of the remaining crude oil.

SUMMARY OF THE INVENTION

This invention provides a process for inhibiting the growth of microorganisms in water used for flooding an oil-bearing formation to effect oil recovery therefrom. In its broad aspects, the process comprises introducing into said microorganism-containing water an unsaturated nitrile compound in a quantity sufficient to at least inhibit the growth of the microorganisms.

DETAILED DESCRIPTION OF THE INVENTION

Waterflooding is an enhanced oil recovery technique by which water is pumped underground via one or more injection wells in order to push the remaining oil towards a production well. Chemicals such as surfactants, polymers, caustic, microemulsions, and the like can optionally be injected together with or separately from the water, as is taught in the art.

Acrylonitrile has been found to be an effective biocide for use during waterflooding or other enhanced recovery methods. Other nitrile compounds, especially alpha, beta-unsaturated compounds including, for example, methacrylonitrile and crotononitrile are contemplated equivalents in this invention. Mixtures of the above compounds or mixtures with other known biocides such as acrolein can be used.

The nitrile compounds disclosed herein are useful to inhibit the growth of microorganisms normally present in injection water. Among those organisms, treatment of anaerobic bacteria and particularly sulfate-reducing bacteria is preferred. SRB's of the genus Desulfovibrio and others such as *Clostridium nigrificans* are especially preferred objects of treatment by this process.

It should be understood that the biocide of this invention can be used with water only, or it can be added to other known aqueous or non-aqueous recovery systems. The method of biocide injection is not critical, although it is preferred that the biocide be thoroughly mixed with the water before contacting the reservoir. Frequency of treatment can be determined by actual or calculated field response to the biocide addition, or the biocide can be continuously added to maintain growth at tolerably low levels.

The quantity of biocide in the injection water should be an effective amount, i.e., an amount sufficient to at least inhibit the growth of microorganisms in the water. Preferably, the amount will be sufficient to kill most of all of the bacteria in the water. Of course, the effective amount is dependent upon several variables including time, temperature, population size, and availability of nutrients to the microbes. In general terms, the quantity should be between about 1 ppm and 10,000 ppm by volume, preferably between about 1 ppm and 200 ppm.

SPECIFIC EMBODIMENTS

Example

A culture of *Desulfovibrio desulfuricans* was maintained in a sea water broth, with transfers made every four days using 10% inoculum in fresh medium (containing a trace amount of ferrous ammonium sulfate) to produce an active culture with maximum population density. This population density was maintained at $10^6$ ($\pm 10\%$) per ml. Dilutions were made to effect populations of $10^5$, $10^4$, $10^3$, and $10^2$ organisms per ml.

Volume per volume dilutions of acrylonitrile were made to produce concentrations in water as follows: 1250, 375, 125, 12.5, and 1.25 ppm. Tubes were prepared containing 9 ml of medium, 1 ml of inoculum together with the appropriate amount of biocide, and were incubated at room temperature (about 28° to 30° C.). Controls were also prepared containing inoculum and medium, but no biocide.

Examinations were made at 2, 3, 4, 7 and 14 days for the formation of ferrous sulfide which indicated bacterial growth. All of the control group showed positive evidence of growth by at least the seventh day. Experimental group data are given in Table I. The effect of acrylonitrile on several population densities are shown. As in any test which deals with microorganisms in suspension, occasional anomalous results are recognized.

TABLE I

| | EFFECT OF ACRYLONITRILE ON DESULFOVIBRIO DESULFURICANS | | | | | | | | | | | | | | | | | | | |
|---|---|---|---|---|---|---|---|---|---|---|---|---|---|---|---|---|---|---|---|---|
| | $10^5$ | | | | | $10^4$ | | | | | $10^3$ | | | | | $10^2$ | | | | |
| Biocide conc. days: | 2 | 3 | 4 | 7 | 14 | 2 | 3 | 4 | 7 | 14 | 2 | 3 | 4 | 7 | 14 | 2 | 3 | 4 | 7 | 14 |
| 1250 ppm | + | ++ | ++ | + | + | +/− | − | + | − | − | − | − | − | − | − | − | − | − | − | − |
| 375 ppm | + | ++ | ++ | + | + | +/− | − | + | − | − | − | − | − | − | − | − | − | − | − | − |
| 125 ppm | + | ++ | ++ | + | + | − | − | − | − | − | − | − | − | − | − | − | − | − | − | − |
| 12.5 ppm | + | ++ | ++ | + | + | − | − | − | − | − | − | − | − | − | − | − | − | − | − | − |
| 1.25 ppm | + | ++ | ++ | + | + | − | − | − | − | − | − | − | − | − | − | +/− | + | + | + | |

KEY:
+ = growth
++ = heavy growth
− = no growth

Comparative Example

A similar system was prepared using acrolein as the biocide. Results are shown below in Table II.

DISCUSSION OF EFFECTIVENESS

In order to determine the comparative effectiveness of these two compounds, an index was established based on the lowest concentration of biocide inhibiting the largest population of inoculum. The following coefficient was calculated;

$$\frac{\text{Concentration of Biocide}}{\text{Exponent of Bacterial Numbers to the Base 10}}$$

For the inventive biocide acrylonitrile, the best coefficient is found at a biocide concentration of 12.5, which inhibited a population of $10^3$. The coefficient for acrylonitrile is 12.5/3=4.1. For the prior art biocide acrolein, this value is 125/4=31. Because the smaller coefficient represents a more effective compound, the use of acrylonitrile gives superior results.

said sulfate reducing bacteria containing water a quantity of acrylonitrile sufficient to at least inhibit the growth of the sulfate reducing bacteria.

2. The process of claim 1 in which the acrylonitrile concentration in the water is between about 1 and 10,000 ppm by volume.

3. The process of claim 2 in which the acrylonitrile concentration is between about 1 and 200 ppm.

4. The process of claim 1 in which the bacteria is selected from the group consisting of the genus Desulfovibrio and the genus Clostridium.

5. The process of claim 4 in which the bacteria is *Desulfovibrio desulfuricans.*

6. In a method for recovery of oil from an underground reservoir, the method comprising injecting water via at least one injection well and recovering oil from a production well, the improvement comprising:
adding acrylonitrile to the water in an amount sufficient to inhibit the growth of sulfate reducing bacteria therein.

7. The process of claim 6 in which the amount of acrylonitrile added to water is sufficient to produce a concentration of acrylonitrile in water of between about 1 and 10,000 ppm by volume.

8. The process of claim 7 in which the bacteria is a member of the genus Desulfovibrio.

9. The process of claim 8 in which the bacteria is *Desulfovibrio desulfuricans.*

TABLE II

| | EFFECT OF ACROLEIN ON DESULFOVIBRIO DESULFURICANS | | | | | | | | | | | | | | | | | | | |
|---|---|---|---|---|---|---|---|---|---|---|---|---|---|---|---|---|---|---|---|---|
| | $10^5$ | | | | | $10^4$ | | | | | $10^3$ | | | | | $10^2$ | | | | |
| Biocide Conc. days: | 2 | 3 | 4 | 7 | 14 | 2 | 3 | 4 | 7 | 14 | 2 | 3 | 4 | 7 | 14 | 2 | 3 | 4 | 7 | 14 |
| 1250 ppm | − | − | − | − | − | − | − | − | − | − | − | − | − | − | − | − | − | − | − | − |
| 375 ppm | +/− | +/− | + | + | + | − | − | − | − | − | − | − | − | − | − | − | − | − | − | − |
| 125 ppm | + | + | ++ | + | + | − | − | − | − | − | − | − | − | − | − | − | − | − | − | − |
| 12.5 ppm | + | + | ++ | + | + | +/− | +/− | + | ++ | ++ | − | − | − | − | − | − | +/− | +/− | + | + |
| 1.25 ppm | + | + | ++ | + | + | + | + | + | + | + | − | + | + | + | + | − | +/− | +/− | + | + |

KEY:
+ = growth
++ = heavy growth
− = no growth

We claim:

1. A process for inhibiting the growth of sulfate reducing bacteria in water used for flooding oil-containing reservoirs, the process comprising introducing into

* * * * *